United States Patent [19]

Richardson et al.

[11] Patent Number: 5,369,637
[45] Date of Patent: Nov. 29, 1994

[54] SIGNAL TRANSMISSION SYSTEM

[75] Inventors: Andrew J. Richardson, Exning; Peter J. Mabey, Cambridge, both of England

[73] Assignee: U.S. Philips Corporation, New York, N.Y.

[21] Appl. No.: 857,137

[22] Filed: Mar. 25, 1992

[30] Foreign Application Priority Data

Apr. 3, 1991 [GB] United Kingdom ............... 9106941.9
Mar. 5, 1992 [GB] United Kingdom ............... 9204726.5

[51] Int. Cl.$^5$ ............................................. H04B 7/212
[52] U.S. Cl. ...................................... 370/84; 370/95.3; 455/51.1; 455/54.1; 455/93
[58] Field of Search ..................... 370/30, 79, 82, 83, 370/84, 95.1, 95.3, 11, 85.7; 455/13.1, 13.2, 54.1, 54.2, 51.1, 61, 102, 142, 144, 73, 74, 93; 375/49, 17; 329/316; 332/108, 119; 371/5.5

[56] References Cited

U.S. PATENT DOCUMENTS

| | | | |
|---|---|---|---|
| 3,534,264 | 10/1970 | Blasbalg et al. | 370/84 |
| 4,244,046 | 1/1981 | Brouard et al. | 370/84 |
| 4,357,700 | 11/1982 | Alvarez, III et al. | 370/83 |
| 4,581,736 | 4/1986 | Dobyns et al. | 370/95.3 |
| 4,589,108 | 5/1986 | Billy | 370/84 |
| 4,751,510 | 6/1988 | SaintMichel et al. | 370/17 |
| 4,763,322 | 8/1988 | Eizenhöfer | 370/84 |
| 4,763,325 | 8/1988 | Wolfe et al. | 370/95.3 |
| 4,972,506 | 11/1990 | Uddenfeldt | 370/84 |
| 5,132,989 | 7/1992 | Bellon | 375/25 |
| 5,212,684 | 5/1983 | MacNamee et al. | 370/79 |

*Primary Examiner*—Benedict V. Safourek
*Attorney, Agent, or Firm*—David R. Treacy

[57] ABSTRACT

A signal transmission system, for example a TDMA system, in which a carrier is divided into a plurality of traffic signal time slots, with optionally, some regularly interspersed control signal time slots. In order to be able to provide flexibility in the symbol rates and/or modulation schemes used by complementary users, the traffic signal time slots have one of at least two predetermined durations. However irrespective of the duration(s) of the traffic signal time slots, the number of symbols per traffic signal time slot remains substantially the same.

26 Claims, 3 Drawing Sheets

SIGNAL TRANSMISSION SYSTEM

BACKGROUND OF THE INVENTION

The present invention relates to a digital transmission system for information signals and particularly, but not exclusively, to a TDMA signal transmission system.

TDMA transmission systems are known per se and two examples are the Digital European Cordless Telephone Standard (DECT) and the digital cellular mobile telephone standard GSM (Groups Specials Mobile). In DECT, for example, each frequency channel is divided into successive concatenated frames and each frame comprises 24 time slots of which the first 12 time slots are allocated to transmission in say the forward direction from a base station and the remaining 12 time slots are allocated to transmission in the reverse direction. The nth (where n is an integer between 1 and 12) and the (n+12)th slot are allocated to one call. The pair of allocated time slots is termed a duplex voice channel and dynamic channel allocation is used by a cordless telephone and/or a base station to obtain a duplex voice channel.

In other TDMA transmission systems, a system controller controls channel allocation but this requires the transmission of system control messages which may be sent in a dedicated time slot in each frame or in a traffic time slot (or channel). For a digital trunked private mobile radio system it has been proposed that 25 kHz carrier spacing be used. However 25 kHz carrier spacing is incompatible with 12.5 kHz carrier spacing used for some analogue systems. Accordingly there is a desire to have a flexible multiple standard TDMA transmission system capable of operating on at least 25 kHz and 12.5 kHz carrier spacings and also of using different modulation schemes to provide different capacities.

SUMMARY OF THE INVENTION

According to the present invention there is provided a transmission system in which a carrier is divided into a plurality of time slots, at least some of which time slots are traffic signal time slots, in which the traffic signal time slots have one of at least two predetermined durations, and in which, irrespective of the duration(s) of the traffic signal time slots, the number of symbols per traffic signal time slot remains substantially the same.

Keeping the number of symbols per time slot simplifies the implementation of transmitters and receivers operating in accordance with a dual frame structure. If a time slot comprising fields for ramping up the transmitter power, synchronisation, sending of control data and sending of data, for example digitised speech, is considered for transmission at low (12.5 kHz carrier spacing) and high (25 kHz carrier spacing) symbol rates, the time slot at the low rate has a duration of substantially twice that of a time slot at the higher rate. As far as ramping and synchronisation are concerned, these are dependent on transmitting and receiving a predetermined number of symbols, irrespective of the symbol rate. With respect to the transmission of control data and the data itself, these will scale directly between the two symbol rates.

As is customary with a TDMA transmission systems the traffic signal time slots may be arranged in concatenated frames which for a particular symbol rate may be of equal duration. The durations of the traffic signal time slots in a frame may be equal or different in order to be able to handle transmissions between complementary users at different symbol rates and/or different modulation schemes having different numbers of levels, for example 2-level (binary), 4-level (e.g. QPSK) and 16-level (e.g. 16QAM). An advantage of this is that different users of the transmission system can have equipments which best suit their application, however they must be able to operate within the different frame and slot structures permitted within the system.

The present invention also relates to a transceiver for use in the transmission system in accordance with the present invention, the transceiver comprising a transmitter, a receiver, channel coding means, and control means for controlling time slot generation by the channel coding means such that each time slot has one of at least two predetermined durations.

BRIEF DESCRIPTION OF THE DRAWINGS

The present invention will now be described, by way of example, with reference to the accompanying drawings, wherein.

In the drawings, the same reference numerals have been used to indicate the corresponding features.

DESCRIPTION OF THE PREFERRED EMBODIMENT

Figure 1:
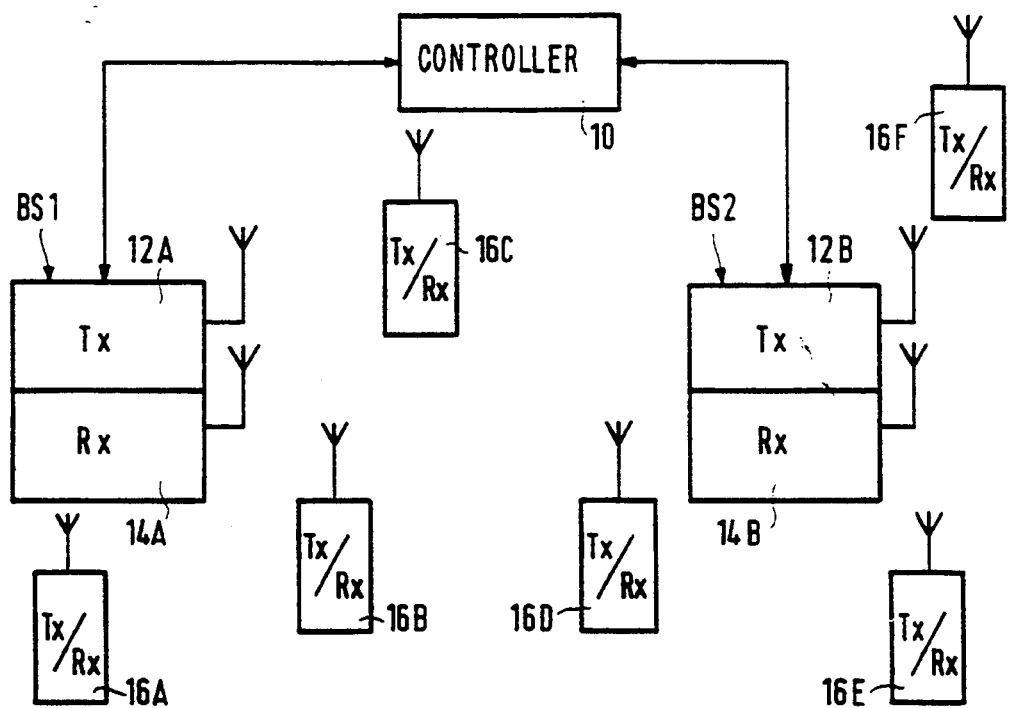
FIG. 1 is a block schematic of a digital trunked TDMA radio system.

The system shown in FIG. 1 comprises a trunking system controller 10 coupled by landline to respective, geographically separate, base station sites BS1, BS2. As the system being described is a two frequency carrier TDMA transmission system, each base station site BS1, BS2 will comprise a transmitter 12A, 12B and a receiver 14A, 14B for each pair of frequency carriers. For convenience only one pair of frequency carriers will be considered, one of the carriers being for forward transmission and the other of the carriers being for reverse transmission. The spacing of the base station sites BS1, BS2 is such that the coverage ranges from the transmitters 12A and 12B just overlap.

The system further comprises a plurality of mobile transceiver units 16A to 16F which are able to roam in and out of the radio range of the transmitters/receivers at the base station sites BS1, BS2. As the transmit powers of the mobile transceiver units 16A to 16F is less than that of the transmitters 12A, 12B additional base station receivers (not shown) may be disposed in the coverage ranges of the respective transmitters and the trunking system controller has a system of voting, known per se, to determine which of the receivers will receive transmissions from a particular mobile unit.

Figure 2:
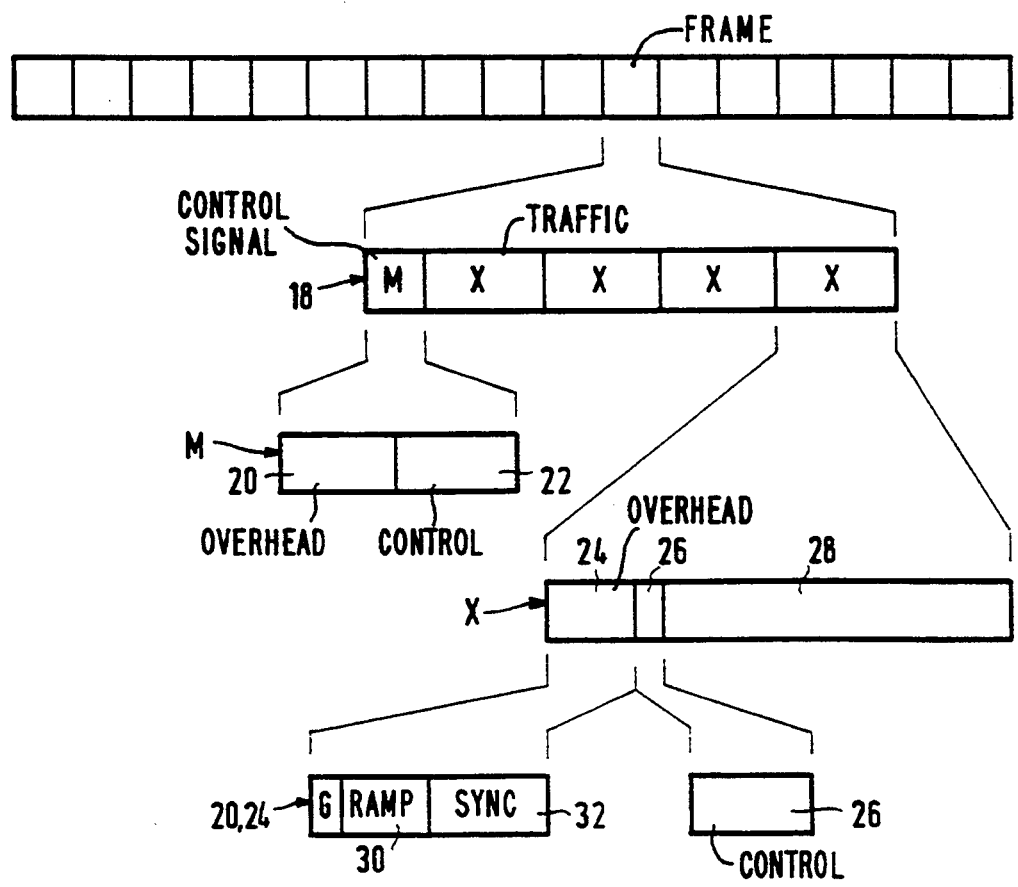
FIG. 2 illustrates one example of a channel structure.

FIG. 2 illustrates one example of a channel structure used on a frequency carrier. The carrier is divided in the time domain into a succession of concatenated frames, each comprising 660 symbols. Each frame 18 comprises a minimum control signal time slot or channel M and 4 traffic signal time slots or channels X. The control channel M comprises an overhead field 20 of 30 symbols followed by control data field 22 also comprising 30 symbols. Each traffic channel X comprises an overhead field 24 of 30 symbols which is followed by a slow control channel field 26 comprising 6 symbols and a traffic data channel field 28 of 114 symbols. The overhead fields 20, 24 commence with an 2 symbol guard space G followed by a ramp period 30 having a duration of 10 symbols and a synchronisation period 32 of duration 18 symbols. For the sake of convenience it will be assumed that the data rate is 16.5 ksymbols/sec.

Figure 3:
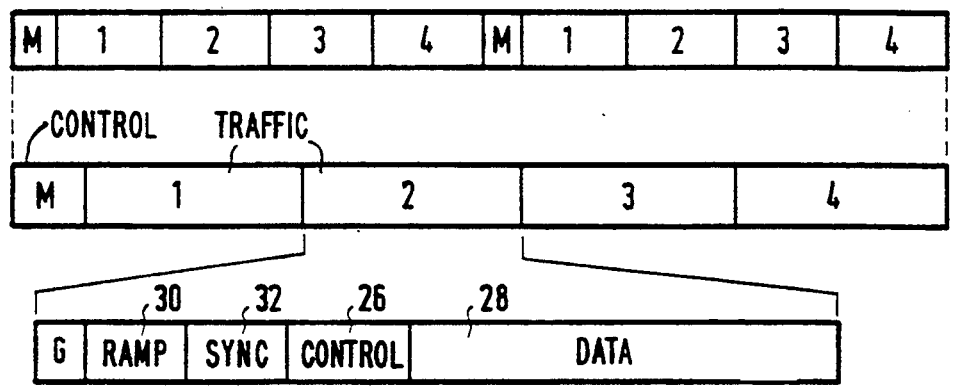
FIG. 3 shows a high rate and low rate channel structure in which each frame includes a minimum control channel, M.

In accordance with the present invention, the channel structure of a frame is based on a protocol in which the number of symbols per time slot (or logical channel) is substantially the same. In the channel structure shown in FIG. 3, the upper diagram corresponds to the structure shown in FIG. 2 whereas the middle diagram corresponds to a lower rate frame structure. Because the number of symbols per time slot is maintained substantially constant then the length (or duration) of a time slot is effectively doubled for the low rate structure so that the duration of one frame of the low rate structure corresponds to the duration of 2 high rate frame structures. Also in order to maintain the fidelity of the digitised speech, the equivalent of two time slots in each high rate frame are in the low rate frame devoted to each transaction which leads to halving the capacity. However keeping the number of symbols per slot constant does not adversely affect the operation of the base stations and/or mobile transceivers because the ramping of the transmitter power waveform and the synchronisation codeword depends on the number of symbols generated and therefore is unaffected by the symbol rate. In the case of the slow control channel field 26 and the traffic data channel field 28 the symbol rate is merely scaled.

Figure 4:
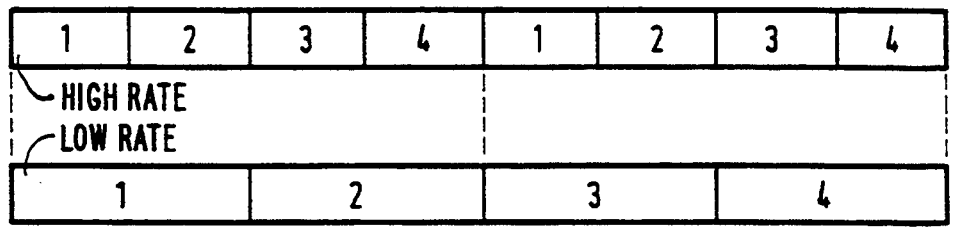
FIG. 4 shows a high rate and low rate channel structure in which control information is transmitted in a traffic channel or time slot.

FIG. 4 illustrates another channel structure in which the control channel M has been omitted and control signalling is sent in traffic channels. Comparing the upper and lower diagrams in FIG. 4 it is apparent that the interface between pairs of high rate slots corresponds to that between one low rate slot and its neighbour. Such a 2:1 arrangement provides flexibility in the usage of the channel structure because high and low rate transmissions can take place on a single frequency carrier. Switching between the high and low rate channels only requires a change in symbol rate, the ramping of the waveform at either frequency is controlled not to increase the interference in adjacent channels, the spectral shaping of the transmitted signals being defined by a Root Raised Cosine response.

Figure 5:
FIG. 5 shows a mixed mode frame structure in which each frame comprises two high rate and one low rate traffic channels or time slots.

FIG. 5 shows two successive frames each comprising two high symbol rate time slots 1, 2 and one low symbol rate time slot 3. Such a mixed mode arrangement provides flexibility when operating a TDMA system. In effect the trunking system controller allocates high rate time slots on the basis of need. Once having allocated the time slots the symbol rate is determined by the type of mobile unit. Thus a low symbol rate mobile unit will require one low rate time slot 3 which is equivalent to 2 high rate time slots. After the communication is complete the time slots can be reallocated.

As an option to switching the symbol rates, the system in accordance with the present invention may be used with different modulation schemes. In such a mode the symbol rate is maintained the same but the number of modulation levels is changed thereby altering the number of users who can access the system.

The following table summarises the number of users which can be supported having regard to the number of levels in the modulation scheme and the carrier frequencies:

|          | 25 kHz  | 12.5 kHz |
|----------|---------|----------|
| 16 level | 8 users | 4 users  |
| 4 level  | 4 users | 2 users  |
| 2 level  | 2 users | 1 user   |

Figure 6:
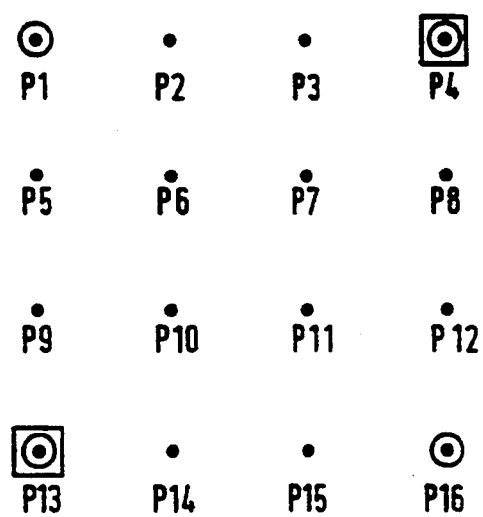
FIG. 6 is a diagram illustrating phase constellations of different modulation schemes having 2, 4 and 16 levels.

These different modulation schemes are indicated in FIG. 6 in which 16QAM is denoted by 16 points numbered from P1 to P16. A 4 level system such as QPSK is denoted by the points P1, P4, P13 and P16 which have been circled. Finally a 2 level system such as PSK is denoted by the points P4 and P13 which have be enclosed by squares.

The synchronisation sequence in each time slot can comprise a sequence key indicating the modulation scheme used. At the receiving end it is assumed that a compatible receiving and demodulating system is or can be used. The synchronisation sequence may be transmitted by a 2 level system, such as PSK, and for convenience this may be the same for all the modulation schemes which can be applied.

In operation if the symbol rate is doubled then the time slot duration is halved. Also if the number of levels is varied then there is a complementary variation in the bit rate. A consequence of these relationships is the number of levels is related to the number of users.

Another factor which has to be borne in mind when switching between high and low symbol rates and/or modulation schemes having different levels is that for example in the case of speech, segment of digitised speech must be encoded before the commencement of the transmission time slot.

Figure 7:
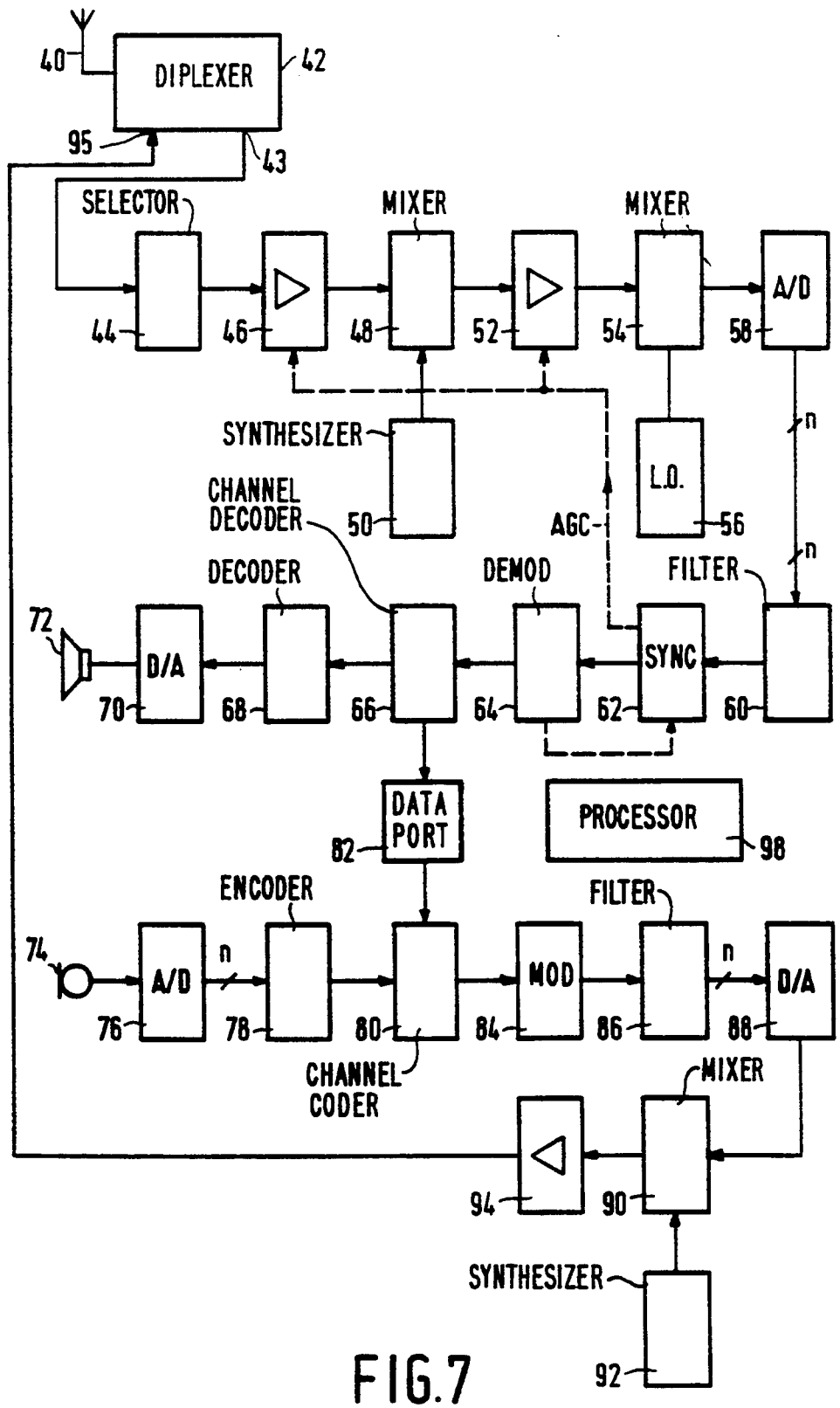
FIG. 7 is a block schematic diagram of a transceiver suitable for use with the system in accordance with the present invention.

FIG. 7 illustrates a transceiver which is incorporated into each of the mobile units 16A to 16F.

For convenience of description the transceiver will be described of a 16QAM modulation scheme.

The transceiver comprises an antenna 40 which is coupled to a diplexer 42 having an output 43 for a received signal and an input 95 for a signal to be transmitted. The output 43 is connected to a RF selectivity stage 44 which has an output coupled to a linear RF amplifier 46 having automatic gain control. Frequency down conversion to a first IF is carried out in a mixer 48 to which a fast switching frequency synthesiser 50 is connected. The frequency down converted signals at the first IF are applied to a gain controlled amplifier and selectivity stage 52. The signals at the output of the stage 52 are frequency down converted to a baseband signal in a second frequency down conversion stage 54 which is supplied with a reference signal from a local oscillator 56. The baseband signals are supplied to an analogue to digital (A to D) converter 58 which provides a parallel output. The digitised signal is applied to a ROM based or a Finite Impulse Response (FIR) filter 60 to complete the selectivity. A carrier recovery and slot synchronisation stage 62 is connected to an output of the filter 60. In the stage 62 carrier recovery is achieved by correlating a stored base-band burst with a known training sequence. If desired equaliser techniques such as decision feedback equaliser (DFE) or Viterbi may be employed in order to track the carrier as the fading channel varies. The stage 62 also provides an AGC signal to the RF amplifier 46 and particularly to the stage 52 to prevent the signal from limiting. The digital signal from the stage 62 is applied to a demodulator 64 in which demodulation is carried out coherently with reference to the derived carrier phase. The demodulated signals are applied to a channel decoder 66 to an output of which a speech decoder 68 is connected. The digitised speech samples are applied to a digital to analogue (D to A) converter 70 to which an acoustic transducer, such as a loudspeaker 72, is connected.

In the case of a speech signal to be transmitted, a microphone 74 is coupled to an A to D converter 76 to produce digitised speech samples which are encoded in a speech encoder 78. The encoded speech is applied to a channel coding and slot generation stage 80 which produces bursts of serial data which are applied to a 16QAM modulator 84. The data may be modulated by being convolutionally encoded and bit interleaved and then grouped into 4-bit symbols for 16QAM modulation. Typically the 4-bit symbols will be mapped onto quadrature related I and Q baseband channels. The output of the modulator is applied to a transmitter filter 86 in which the spectral shaping of the I and Q baseband channels is defined by a Root Raised Cosine response. The filter 86 may be implemented as a ROM based look up table or as a FIR. The filtered 4-bit symbols are applied to a D to A converter 88. The analogue signal obtained is frequency up-converted to its transmitter frequency in a mixer 90 to which a fast switching frequency synthesiser 92 is connected. The frequency up-converted signals are amplified in a linear amplifier 94 and applied to the input 95 of the diplexer 42 which includes a PIN diode switch to achieve the required transmit switching speeds.

The linear amplifier 94 may be implemented as a class A linear amplifier which may be acceptable for non-portable uses due to the relatively low efficiencies which are achievable. As an alternative the linearisation of a class B/C amplifier by the use of feedback loop, such as a Cartesian loop, is likely to achieve a compact and efficient transmitter amplifier. The provision of a feedback loop around a class B/C amplifier offers the possibility of burst shaping and power control.

A central control processor 98 performs the overall coordination and housekeeping of the transceiver functions. The processor 98, which may comprise one or more microcontrollers, will look after such functions as monitoring and accessing the frame, higher level protocols, call processing, and the user interface.

For data applications, a user data port 82 is connected between the channel decoder 66 and the channel coder 80.

From reading the present disclosure, other modifications will be apparent to persons skilled in the art. Such modifications may involve other features which are already known in the design, manufacture and use of TDMA transmission systems and transceivers for use in such systems and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

We claim:

1. A method of transmitting information signals in the form of symbols over a digital transmission system having a carrier, comprising:

dividing said carrier into a plurality of time slots, at least some of said time slots being traffic signal time slots, each said traffic signal time slot having a respective duration equal to one of at least two different predetermined durations, at least one of said traffic signal time slots having a duration equal to a given one of said predetermined durations, and at least another of said traffic signal time slots having a duration equal to a different one of said predetermined durations, and transmitting a respective plurality of symbols in each traffic signal time slot, each said plurality having substantially the same number of symbols, irrespective of the duration of the respective traffic signal time slot.

2. A method as claimed in claim 1, wherein said same number of symbols is a multiplicity of symbols, further comprising arranging said time slots in concatenated frames, each respective frame containing traffic signal time slots having a same respective duration.

3. A method as claimed in claim 2, characterized in that said frames each have a substantially equal duration.

4. A method as claimed in claim 2, further comprising using one predetermined symbol rate for transmitting traffic signals in said one of said traffic signal time slots, and using a different predetermined symbol rate for transmitting other traffic signals in said another of said traffic signal time slots.

5. A method as claimed in claim 1, further comprising:

arranging said time slots in concatenated frames, each respective frame containing traffic signal time slots having a same respective duration, using one predetermined symbol rate for transmitting traffic signals in said one of said traffic signal time slots, and using a different predetermined symbol rate for transmitting other traffic signals in said another of said traffic signal time slots, and transmitting control signals respectively relating to said traffic signal time slots at a same control symbol rate irrespective of the duration of the respective traffic signal time slots.

6. A method as claimed in claim 1, further comprising:

arranging said time slots in concatenated frames, each respective frame containing traffic signal time slots having a same respective duration, and using one predetermined modulation scheme for transmitting certain traffic signals, and using a different predetermined modulation scheme for transmitting certain other traffic signals.

7. A method as claimed in claim 6, further comprising including in each traffic signal time slot a respective synchronization sequence which comprises symbols which are common to the predetermined modulation scheme used in that traffic signal time slot, including in said respective synchronization sequence a sequence key indicative of the number of modulation levels used in said predetermined modulation scheme used in that traffic signal time slot, providing a receiving station for receiving a given traffic signal time slot, having a demodulator, and responsive to receipt of the sequence key for said given traffic signal time slot by said receiver, selecting the demodulation scheme to be used in said demodulator, and demodulating the traffic signal contained in said given traffic signal time slot.

8. A method as claimed in claim 1, wherein said same number of symbols is a multiplicity of symbols, further comprising arranging said time slots in concatenated frames, one of said frames containing at least said one of said traffic signal time slots and at least said another of said traffic signal time slots.

9. A method as claimed in claim 8, further comprising using one predetermined modulation scheme for transmitting certain traffic signals, and using a different predetermined modulation scheme for transmitting certain other traffic signals.

10. A method as claimed in claim 9, further comprising including in each traffic signal time slot a respective synchronization sequence which comprises symbols which are common to the predetermined modulation scheme used in that traffic signal time slot, including in said respective synchronization sequence a sequence key indicative of the number of modulation levels used in said predetermined modulation scheme used in that traffic signal time slot, providing a receiving station for receiving a given traffic signal time slot, having a demodulator, and responsive to receipt of the sequence key for said given traffic signal time slot by said receiver, selecting the demodulation scheme to be used in said demodulator, and demodulating the traffic signal contained in said given traffic signal time slot.

11. A method as claimed in claim 8, further comprising using one predetermined symbol rate for transmitting traffic signals in said one of said traffic signal time slots, and using a different predetermined symbol rate for transmitting other traffic signals in said another of said traffic signal time slots.

12. A method as claimed in claim 1, further comprising:

arranging said time slots in concatenated frames, one of said frames containing at least said one of said traffic signal time slots and at least said another of said traffic signal time slots, using one predetermined symbol rate for transmitting traffic signals in said one of said traffic signal time slots, and using a different predetermined symbol rate for transmitting other traffic signals in said another of said traffic signal time slots, and transmitting control signals respectively relating to said traffic signal time slots at a same control symbol rate irrespective of the duration of the respective traffic signal time slots.

13. A method as claimed in claim 1, wherein said same number of symbols is a multiplicity of symbols, further comprising arranging said time slots in concatenated frames, at least one of said frames containing traffic signal time slots having a same respective duration, and another of said frames containing at least said one of said traffic signal time slots and at least said another of said traffic signal time slots.

14. A method as claimed in claim 13, further comprising using one predetermined modulation scheme for transmitting certain traffic signals, and using a different predetermined modulation scheme for transmitting certain other traffic signals.

15. A method as claimed in claim 14, further comprising including in each traffic signal time slot a respective synchronization sequence which comprises symbols which are common to the predetermined modulation scheme used in that traffic signal time slot, including in said respective synchronization sequence a sequence key indicative of the number of modulation levels used in said predetermined modulation scheme used in that traffic signal time slot, providing a receiving station for receiving a given traffic signal time slot, having a demodulator, and responsive to receipt of the sequence key for said given traffic signal time slot by said receiver, selecting the demodulation scheme to be used in said demodulator, and demodulating the traffic signal contained in said given traffic signal time slot.

16. A method as claimed in claim 13, further comprising using one predetermined symbol rate for transmitting traffic signals in said one of said traffic signal time slots, and using a different predetermined symbol rate for transmitting other traffic signals in said another of said traffic signal time slots.

17. A method as claimed in claim 1, further comprising:

arranging said time slots in concatenated frames, at least one of said frames containing traffic signal time slots having a same respective duration, and at least another of said frames containing at least one traffic signal time slot having a duration different from at least one other traffic signal time slot in said one of said frames, using one predetermined symbol rate for transmitting traffic signals in said one of said traffic signal time slots, and using a different predetermined symbol rate for transmitting other traffic signals in said another of said traffic signal time slots, and transmitting control signals respectively relating to said traffic signal time slots at a same control symbol rate irrespective of the duration of the respective traffic signal time slots.

18. A method as claimed in claim 1, wherein said same number of symbols is a multiplicity of symbols, further comprising using one predetermined symbol rate for transmitting traffic signals in said one of said traffic signal time slots, and using a different predetermined symbol rate for transmitting other traffic signals in said another of said traffic signal time slots.

19. A method as claimed in claim 1, further comprising using One predetermined symbol rate for transmitting traffic signals in said one of said traffic signal time slots, and using a different predetermined symbol rate for transmitting other traffic signals in said another of said traffic signal time slots, and transmitting control signals respectively relating to said traffic signal time slots at a same control symbol rate irrespective of the duration of the respective traffic signal time slots.

20. A method as claimed in claim 1, further comprising using one predetermined modulation scheme for transmitting certain traffic signals, and using a different predetermined modulation scheme for transmitting certain other traffic signals.

21. A method as claimed in claim 20, further comprising including in each traffic signal time slot a respective synchronization sequence which comprises symbols which are common to the predetermined modulation scheme used in that traffic signal time slot, including in said respective synchronization sequence a sequence key indicative of the number of modulation levels used in said predetermined modulation scheme used in that traffic signal time slot, providing a receiving station for receiving a given traffic signal time slot, having a demodulator, and responsive to receipt of the sequence key for said given traffic signal time slot by said receiver, selecting the demodulation scheme to be used in said demodulator, and demodulating the traffic signal contained in said given traffic signal time slot.

22. A method as claimed in claim 1, further comprising transmitting control signals respectively relating to said traffic signal time slots at a same control symbol rate irrespective of the duration of the respective traffic signal time slots.

23. A receiving station for signals transmitted over a carrier which is divided into a plurality of time slots including a plurality of traffic signal time slots, said traffic signal time slots having one of at least two predetermined durations, the number of symbols per traffic signal time slot remaining substantially the same irrespective of the durations of the traffic signal time slots, and traffic signal symbols in each time slot being transmitted according to a respective predetermined modulation scheme, each traffic signal time slot including a synchronization sequence which comprises symbols which are common to each predetermined modulation scheme, said synchronization sequence including a sequence key indicative of the number of modulation levels used in the transmission of the traffic signal, and said receiving station comprising:
means responsive to receipt of said sequence key for selecting the demodulation scheme to be used, and means, responsive to selection of said demodulation scheme, for demodulating the traffic signal contained in the time slot.

24. A transceiver for transmitting and receiving signals over a carrier which is divided into a plurality of time slots including a plurality of traffic signal time slots, said traffic signal time slots having one of at least two predetermined durations, traffic signal symbols in each time slot being transmitted according to a respective one of a plurality of predetermined protocols, the number of symbols per traffic signal time slot remaining substantially the same irrespective of the durations of the traffic signal time slots, said transceiver comprising:
means for receiving a digital signal to be transmitted according to a predetermined one of said protocols, channel coding means for grouping said signal to be transmitted, into groups of symbols to be transmitted in different traffic signal time slots, prior to the commencement of the respective traffic signal time slots, control means for controlling time slot generation by the channel coding means such that each time slot has one of said predetermined durations, a transmitter for transmitting said groups of symbols in said respective traffic signal time slots, according to said predetermined one of said protocols, and a receiver for receiving groups of symbols which were transmitted according to said predetermined one of said protocols in respective traffic signal time slots having one of said predetermined durations.

25. A transceiver as claimed in claim 24, characterized in that said predetermined protocol determines the symbol rate for transmission in the respective traffic signal time slots.

26. A transceiver as claimed in claim 24, characterized in that said predetermined protocol determines the modulation scheme for transmission in the respective traffic time slots.

* * * * *